(12) United States Patent
Nagai

(10) Patent No.: US 7,777,440 B2
(45) Date of Patent: Aug. 17, 2010

(54) MOTOR DRIVING CIRCUIT AND METHOD FOR CONTROLLING A MOTORIZED ROLLER

(75) Inventor: Yoshinori Nagai, Kakogawa (JP)

(73) Assignee: Itoh Denki Co., Ltd. (JP)

( * ) Notice: Subject to any disclaimer, the term of this patent is extended or adjusted under 35 U.S.C. 154(b) by 933 days.

(21) Appl. No.: 11/490,385

(22) Filed: Jul. 20, 2006

(65) Prior Publication Data

US 2007/0024218 A1 Feb. 1, 2007

(30) Foreign Application Priority Data

Aug. 1, 2005 (JP) .............................. 2005/222879

(51) Int. Cl.
*H02P 7/00* (2006.01)
*H02P 7/29* (2006.01)
(52) U.S. Cl. ...................................... 318/434; 318/432
(58) Field of Classification Search ................. 318/463, 318/468, 467, 456, 452, 430–434
See application file for complete search history.

(56) References Cited

U.S. PATENT DOCUMENTS

| | | | |
|---|---|---|---|
| 3,845,375 A | | 10/1974 | Stiebel |
| 3,878,933 A | * | 4/1975 | Bauer et al. .................. 198/350 |
| 4,025,832 A | | 5/1977 | Jones, III |
| 4,145,728 A | | 3/1979 | Royer |
| 4,251,759 A | * | 2/1981 | Boldt .......................... 318/490 |
| 4,910,447 A | | 3/1990 | Masters |
| 2004/0173440 A1 | | 9/2004 | Mauch et al. |
| 2006/0016919 A1 | * | 1/2006 | Castronovo .................. 241/34 |

FOREIGN PATENT DOCUMENTS

| | | |
|---|---|---|
| EP | 0808011 A1 | 11/1997 |
| EP | 1047182 | 8/2002 |
| JP | 62146849 | 6/1987 |
| JP | 09-163786 | 6/1997 |
| JP | 09-215388 | 8/1997 |
| JP | 11-122703 | 4/1999 |
| JP | 2005-104656 | 4/2005 |
| WO | WO 99/00317 A1 | 1/1999 |
| WO | WO 03/008307 A1 | 1/2003 |

* cited by examiner

*Primary Examiner*—Walter Benson
*Assistant Examiner*—Eduardo Colon
(74) *Attorney, Agent, or Firm*—Wood, Phillips, Katz, Clark & Mortimer (57) ABSTRACT

A motorized roller incorporating a driving motor for driving the roller and accompanied with a motor driving circuit for driving the motor, including a lock detecting structure adapted to detect a lock of at least one of the driving motor and the motorized roller and a power control structure adapted to control electric power supplied to the driving motor, wherein the power control structure is adapted to reduce the electric power supplied to the driving motor upon detection of the lock of the at least one of the driving motor and motorized roller by the lock detecting structure.

16 Claims, 9 Drawing Sheets

FIG.9

MOTOR DRIVING CIRCUIT AND METHOD FOR CONTROLLING A MOTORIZED ROLLER

BACKGROUND OF THE INVENTION

1. Field of the Invention

The present invention relates to an improvement of a motorized roller driven by a driving motor and accompanied with a motor driving circuit, a controller for the motorized roller, a method for controlling the driving motor, a conveyor driven by the motor, and a method for controlling the conveyor.

2. Description of Related Art

It is often the case that a motorized roller incorporating a driving motor is used in a device such as a conveyor. In the motorized roller, a lock of rotation of the incorporated driving motor overloads the driving motor to generate heat in a motor driving circuit or a motor coil, resulting in a possibility of heat damage of the motor driving circuit or the motor coil.

Therefore, a controller for controlling conveyance has been conventionally disposed to protect the motor driving circuit or the motor coil that generates heat in the driving motor, so as to avoid heat damage of the motor driving circuit or the motor coil by halting conveyance by a conveyor or stopping power supply to the motor driving circuit after a certain period of time of a lock of rotation of the driving motor. For example, each of the patent documents 1 and 2 discloses a configuration for limiting current value so as to prevent burnout of the driving motor in the case that the driving motor is trapped or overloaded.

However, a lock of rotation of the driving motor in the motorized roller may be resulted from temporary jam of an article to be conveyed, and thus may be released by clearance of the jam. Therefore, in the case that the jam of an article has caused a lock, it is preferable to continue electric power supply for a few seconds rather than immediately stopping the supply.

As described above, if the driving motor in the motorized roller has become locked, the driving motor is overloaded and the motor driving circuit (especially a power transistor) generates heat. Therefore, conventionally, electric power supply has been stopped or a radiator plate has been in advance disposed in the motor driving circuit so as to avoid heat damage of the driving motor.

However, along with a recent miniaturization trend of components themselves, miniaturized components have been supplied to a motor driving circuit. If a radiator plate is also miniaturized, the heat is not sufficiently radiated, resulting in difficulty in total miniaturization of the motor driving circuit.

Patent Document 1: JP 9-117055A
Patent Document 2: Japanese Patent Publication No. 2538977

SUMMARY OF THE INVENTION

An object of the present invention made in view of the problems and drawbacks described above is therefore to avoid heat damage of a driving motor in the case that rotation of the motor becomes locked and simultaneously to provide an advanced motorized roller driven by a driving motor provided with a motor driving circuit capable of avoiding heat damage of the motor, a controller for the motorized roller, a method for controlling the driving motor, a conveyor driven by the motor, and a method for controlling the conveyor.

In order to achieve the object described above, an aspect of the present invention provided herein is a motorized roller incorporating a driving motor for driving the roller and accompanied with a motor driving circuit for driving the motor, including a lock detecting means adapted to detect a lock of at least one selected from the driving motor and the motorized roller and a power control means adapted to control electric power supplied to the driving motor, wherein the control means is adapted to reduce the electric power supplied to the driving motor upon detection of the lock of the at least one by the lock detecting means.

A characterized configuration on the invention described above can be applied to a controller for the motorized roller, a conveyor, or a method for controlling the conveyor.

It is possible to constitute, for example, a conveyor including a driving motor for driving the conveyor, a motor driving circuit for driving the driving motor, a lock detecting means adapted to detect a lock of the driving motor, and a power control means adapted to control electric power supplied to the driving motor, wherein the control means is adapted to reduce electric power supplied to the driving motor upon detection of the lock of the driving motor by the lock detecting means.

Herein, the lock detecting means and the power control means are preferably integrated into the motor driving circuit, but can be disposed separately therefrom.

A method for controlling a conveyor driven by a driving motor and having a motor driving circuit including the steps of a step of detecting a lock of the driving motor and a step of reducing electric power supplied to the driving motor upon detection of the lock is thought of as a way to apply the above mentioned invention to the method for controlling the conveyor.

As an aspect embodying the above-mentioned invention, it is preferable that the power control means increase the electric power supplied to a component such as the driving motor up to a normal operating level if and when the lock of the motor or the roller is undetectable.

Motor pulses detected by the Hall ICs in the motor, for example, can be applied to the lock detecting means.

The present aspect has the lock detecting means for detecting whether rotation of the motor or the roller is locked, thereby immediately recognizing that the motor is coming into overload.

Further, the present aspect has the power control means for controlling electric power supplied to the motor, thereby reducing the electric power in the case of overload of the motor to reduce heat generation of the motor.

Upon detection of the lock of the motor or the roller by the lock detecting means, the control means reduces electric power supplied to the motor, thereby preventing heat damage of the motor.

Further, reduction of the electric power supplied to the motor reduces heat generation, thereby dispensing with a conventional large radiator plate and achieving miniaturization of the motor.

The control means is preferably adapted to reduce the electric power supplied to the driving motor in a stepwise fashion.

If the motor is still locked when the electric power supplied to the motor is increased up to a normal operating level, it is preferable to reduce the supplied electric power again to regulate heat generation.

In the present aspect, the power control means reduces the electric power supplied to the motor in a stepwise fashion, so that heat generation is reduced to avoid heat damage of the motor even if rotation of the motor or the roller becomes locked. Further, in the case that a stuck article causes a lock, conveying operations are restarted immediately upon release of the stuck article because the motor is not brought to a halt.

Further, it is preferable to have such a structure as intermittently supplying electric power to the driving motor upon detection of the lock and under a predetermined condition.

It is also possible to avoid heat damage of the motor by performing reduction of the electric power by reduction of voltage applied to the motor and by starting an intermittent supply of electric power to the driving motor on the condition that a voltage supplied to the motor drops below a preset lower threshold.

The present aspect performs an intermittent supply of electric power to the motor, thereby restricting heat generation of the motor to avoid heat damage of the motor. Further, it is possible to release a slight sticking by producing a vibration in a conveyed article.

It is also preferable to have such a structure as reducing the electric power supplied to the driving motor in a stepwise fashion and starting an intermittent supply of electric power to the driving motor on the condition that the number of stepwise reduction of the electric power supplied to the motor has reached a preset number.

The present aspect avoids heat damage of the motor by starting an intermittent supply of electric power to the motor on the condition that the number of stepwise reduction of the electric power has reached a preset number.

It is also possible to avoid heat damage of the motor by starting an intermittent supply of electric power to the driving motor on the condition that an integrated value of the electric power supplied to the driving motor after detection of the lock exceeds a preset upper threshold.

The present aspect starts an intermittent supply of electric power to the driving motor on the condition that an integrated value of the electric power supplied to the driving motor after detection of the lock exceeds a preset upper threshold, thereby avoiding heat damage of the motor.

Another aspect relating to a controlling method is one for controlling a driving motor for driving a motorized roller and incorporated in the roller including detecting a lock of at least one selected from the motorized roller and the driving motor, so as to reduce electric power supplied to the driving motor upon detection of the lock.

Still another aspect relating to the method exerting an effect similar to the above-mentioned aspect includes the steps of a step of detecting a lock of at least one selected from the motorized roller and the driving motor, and a step of reducing electric power supplied to the driving motor upon detection of the lock.

The present aspect takes the method of controlling the motor driving circuit in such a manner as including the steps of a step of detecting a lock of at least one selected from the motorized roller and the driving motor, and a step of reducing electric power supplied to the driving motor upon detection of the lock, thereby avoiding heat damage of the motor.

It is also preferable to have such a structure as determining whether the number of detection of the lock has reached a predetermined number, so as to start an intermittent supply of electric power to the driving motor on the condition that the number of detection of the lock has reached the predetermined number.

A more specific method may include one including the step of determining whether the number of detection of the lock has reached the predetermined number so as to start an intermittent supply of electric power to the driving motor on the condition that the number of detection of the lock has reached the predetermined number to avoid heat damage of the motor.

The above-mentioned method starts an intermittent supply of electric power to the driving motor on the condition that the number of detection of the lock has reached the predetermined number, thereby avoiding heat damage of the motor.

In order to control a driving motor or a conveyor, it is also preferable to calculate an integrated value of the electric power supplied to the driving motor after detection of the lock, so as to start an intermittent supply of electric power to the driving motor on the condition that the integrated value exceeds a preset upper threshold.

Further, in order to control a driving motor, it is preferable to including the step of calculating an integrated value of the electric power supplied to the driving motor after detection of the lock, so as to start an intermittent supply of electric power to the driving motor on the condition that the integrated value exceeds a preset upper threshold to avoid heat damage of the motor.

DESCRIPTION OF THE PREFERRED EMBODIMENTS

Now, a preferred embodiment of the present invention will be described below, making reference to the accompanying drawings.

Figure 1:
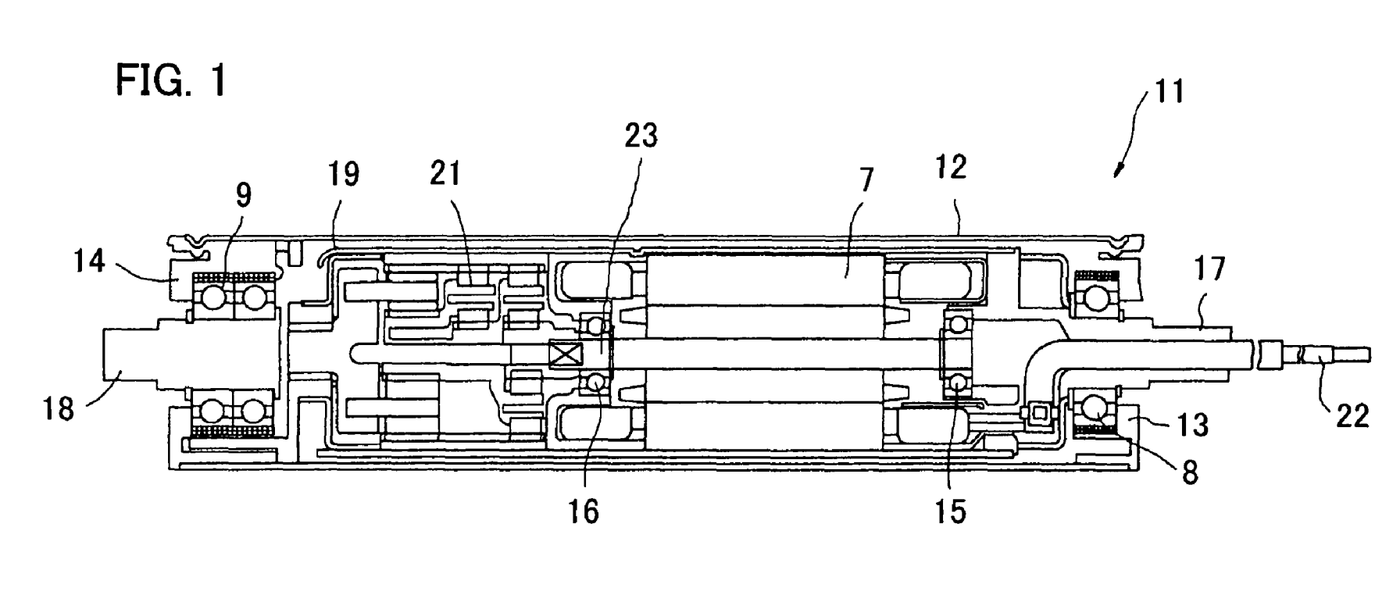
FIG. 1 is a sectional view of a motorized roller for embodying the present invention.

FIG. 1 is a sectional view of a motorized roller as described above, but hatching is omitted.

Referring to FIG. 1, a motorized roller 11 incorporates a driving motor 7 and a speed reducer 21 in a roller body 12 of a hollow cylindrical shape. The roller body 12 is a tube made of metal with both ends opening, the both ends being closed by closure members 13 and 14. Fixed shafts 17 and 18 penetrate through the closure members 13 and 14 and support the roller body 12 rotatably via shaft bearings 8 and 9, respectively.

The fixed shaft 17 penetrates through the closure member 13 out of the roller body 12. The fixed shaft 17 has an enlarged diameter portion arranged within the roller body 12 and supports an inner cylinder 19 secured to the outer periphery of the enlarged diameter portion. The inner cylinder 19 has an outer diameter enough to keep from contacting with the inner surface and substantially the same length as that obtained by subtracting lengths of the closure members 13 and 14 from a total length of the roller body 12. Further, as shown in FIG. 1, the inner cylinder 19 incorporates the driving motor 7 and the speed reducer 21 secured thereto so as to form a unit. On the other hand, the fixed shaft 18 is a rod-like member and supports the closure member 14 (or roller body 12) rotatably via the shaft bearing 9 having a double structure.

Figure 2:
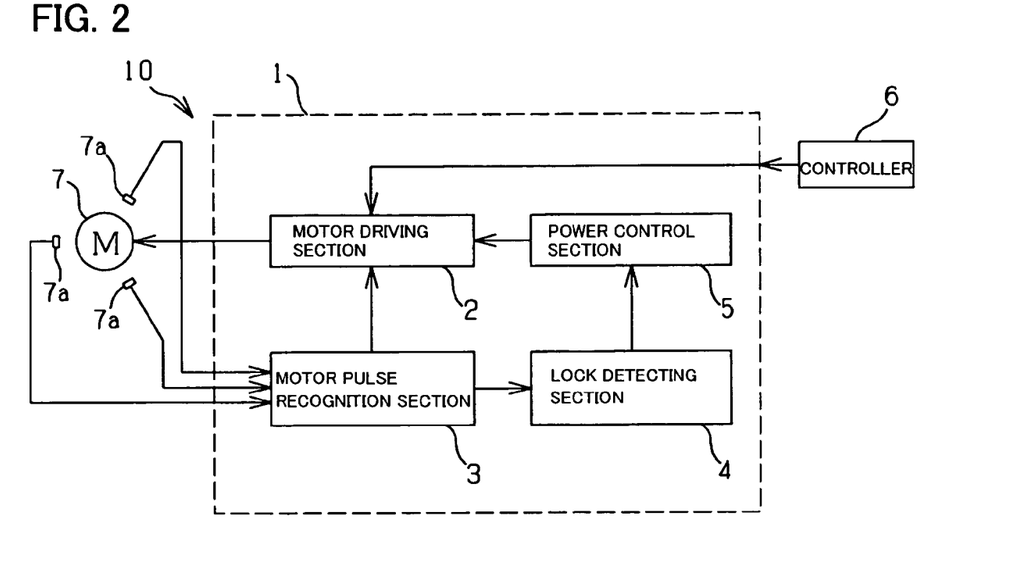
FIG. 2 is a control block diagram of a driving motor for a roller conveyor embodying the present invention.

A three-phase and four-pole brushless motor can be employed as the driving motor 7, for example. The inner cylinder 19 includes therewithin a plurality of stators (not shown) each with a magnetic coil constituted by a wiring wound around an iron core, a rotational shaft 23 of a rotor (not shown) having magnetic poles, and Hall ICs 7a (FIG. 2).

A central axis of the rotational shaft 23 corresponds with that of the inner cylinder 19. An end (to the right of FIG. 1) of the rotational shaft 23 is rotatably supported by the fixed shaft 17 via a shaft bearing 15, whereas the other end (to the left of FIG. 1) of the rotational shaft 23 is connected to the reducer 21 that transmits rotational power of the rotational shaft 23 to the roller body 12 with reduced rotation numbers.

A plurality of the Hall ICs 7a (three in FIG. 2) are arranged adjacent to the rotational shaft 23. Each Hall IC 7a detects a circumferential position of a magnetic pole of the rotor and outputs a magnetic-pole detection signal.

The Hall IC 7a consists mainly of an integration of a Hall element and a whole or a part of a power switching circuit. More specifically, the Hall IC 7a includes the Hall element for detecting an intensity of a magnetic field, an amplifier for amplifying a small signal detected by the Hall element, a Schmitt trigger circuit for forming a square wave from an amplified signal by the amplifier, a stabilized power supply circuit, and a temperature compensation circuit. The present embodiment illustrates an example employing the Hall ICs 7a so as to detect a position of a magnetic pole, but the present invention is not limited thereto and may employ any magnetic-pole position detector including a photo-interrupter type using light-emitting diodes and a photo sensor or an inductance type using an element employing magnetic saturation effect.

The driving motor 7 is connected to a motor driving circuit 1 (FIG. 2) for controlling a rotation drive of the rotor (rotational shaft 23). As shown in FIG. 2, the motor driving circuit 1 consists mainly of a motor driving section 2, a motor pulse recognition section 3, a lock detecting section 4, and a power control section 5. Herein, the motor driving circuit 1 is physically separated from the driving motor 7, but is essential for operating the driving motor.

The motor driving section 2 is constituted by an integrated circuit using a circuit such as a CMOS IC, a differentiating circuit, or an integrating circuit, to which section 2 control signals from a controller 6 (supervisory control system) such as PLC (programmable logic controller) are inputted. The power control section 5 outputs control signals for controlling electric power supplied to the driving motor 7. Control of the electric power is, for example, performed by control of voltage applied to the motor.

The motor pulse recognition section 3 is connected to each Hall IC 7a via a signal line, into which section 3 the magnetic-pole detection signal (rotating speed sensing signal) outputted from the Hall IC 7a is inputted. The motor pulse recognition section 3 executes a processing such as a pulse shape processing to the magnetic-pole detection signal to send the processed signal to the motor driving section 2, whereupon the motor drive section 2 supply electric power to the driving motor 7 in response to each signal processed at and outputted from the power control section 5 and the motor pulse recognition section 3.

As shown in FIG. 1, a wiring 22 via which electric power is supplied to the driving motor 7 of the motorized roller 11 is derived outside from the fixed shaft 17 penetrating through the roller body 12.

Figure 4:
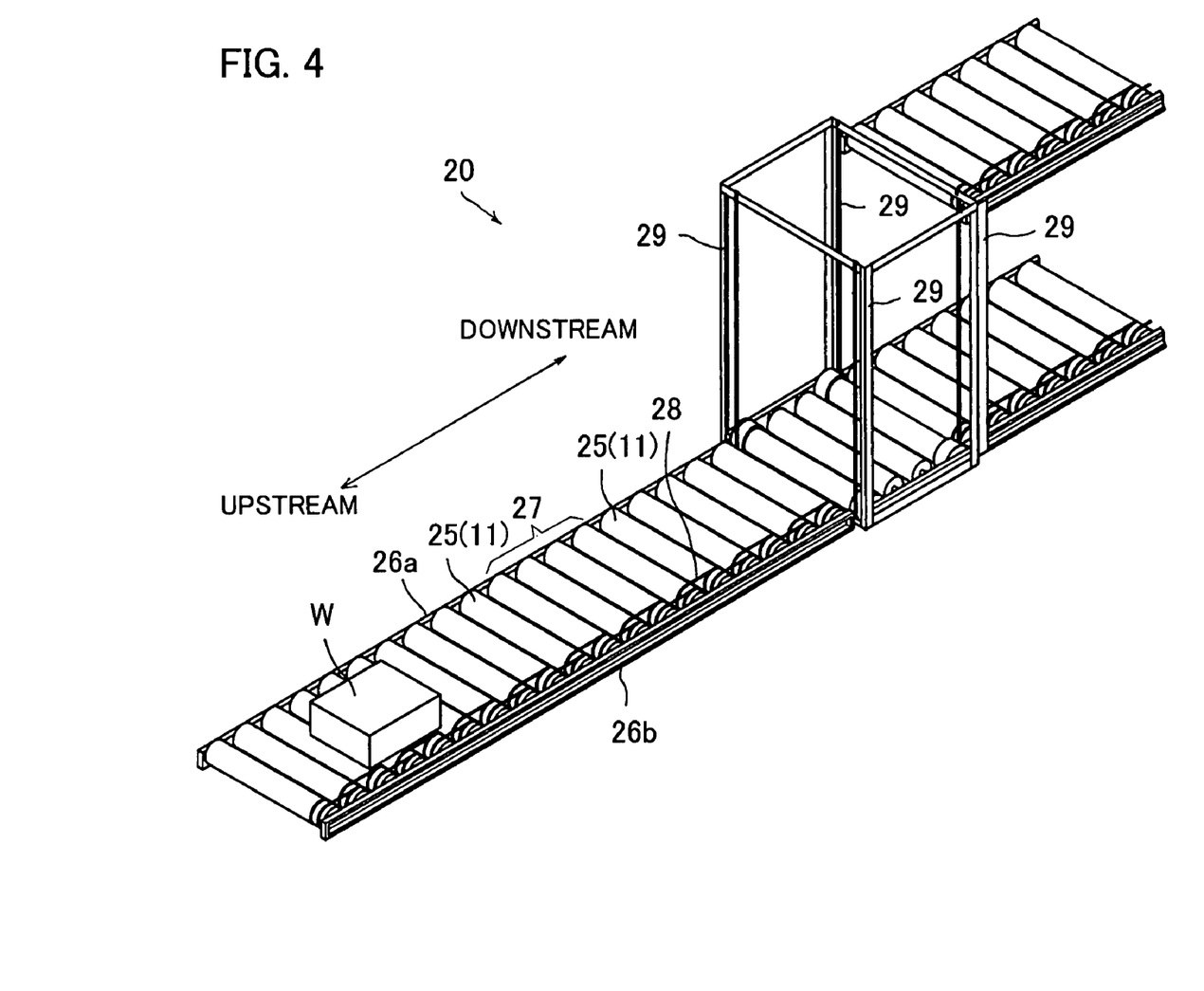
FIG. 4 is a perspective view of a conveyor incorporating the motorized roller shown in FIG. 1.

The motorized roller 11 described above is used as a driving roller 25 for a conveyor 20 (conveying device) as shown in FIG. 4. The conveyor 20 is constituted by a plurality of the driving rollers 25 (motorized roller 11) and driven rollers 27 arranged in parallel rows between a pair of side rails 26a and 26b positioned parallel on each side. The driven rollers 27 each is an idle roller supported rotatably relative to a fixed shaft (not shown) fixed between the side rails 26a and 26b.

One driving roller 25 (motorized roller 11) and a plurality of the adjacent driven rollers 27 (four rollers in FIG. 4) are mutually connected by endless belts 28, so that a driving force of the driving roller 25 (motorized roller 11) is transmitted to a plurality of the driven rollers 27 via the endless belts 28.

Now, the case that a conveyed article W is trapped with poles 29 disposed at the conveyor 20 and prevented from moving downstream will be described below.

Referring to FIG. 2, a heat damage protection and control device 10 (hereinafter referred to as a controller 10) is integrated into the motor driving circuit 1. The motor driving circuit 1 consists mainly of the motor drive section, which consists mainly of a power transistor and a driving/stopping recognition circuit, the motor pulse recognition circuit 3 for recognizing a motor pulse of the driving motor 7, the lock detecting section 4 (lock detecting means) for detecting whether rotation of the driving motor 7 is locked, and the power control section 5 for controlling electric power supplied to the driving motor 7.

Herein, the motor driving circuit 1 is positioned outside of the motorized roller 11 (outside of the roller body 12) in the present embodiment, but may be positioned within the roller body 12.

If the driving motor 7 becomes locked, especially the motor driving section 2 among the sections of the motor driving circuit 1 generates heat.

The controller 6 such as PLC (programmable logic controller) controls driving/stopping of the motor driving section 2, thereby regulating electric power supplied to the driving motor 7 in a normal operating state (viz. in the case of an unlock of the motor 7).

Figure 5:
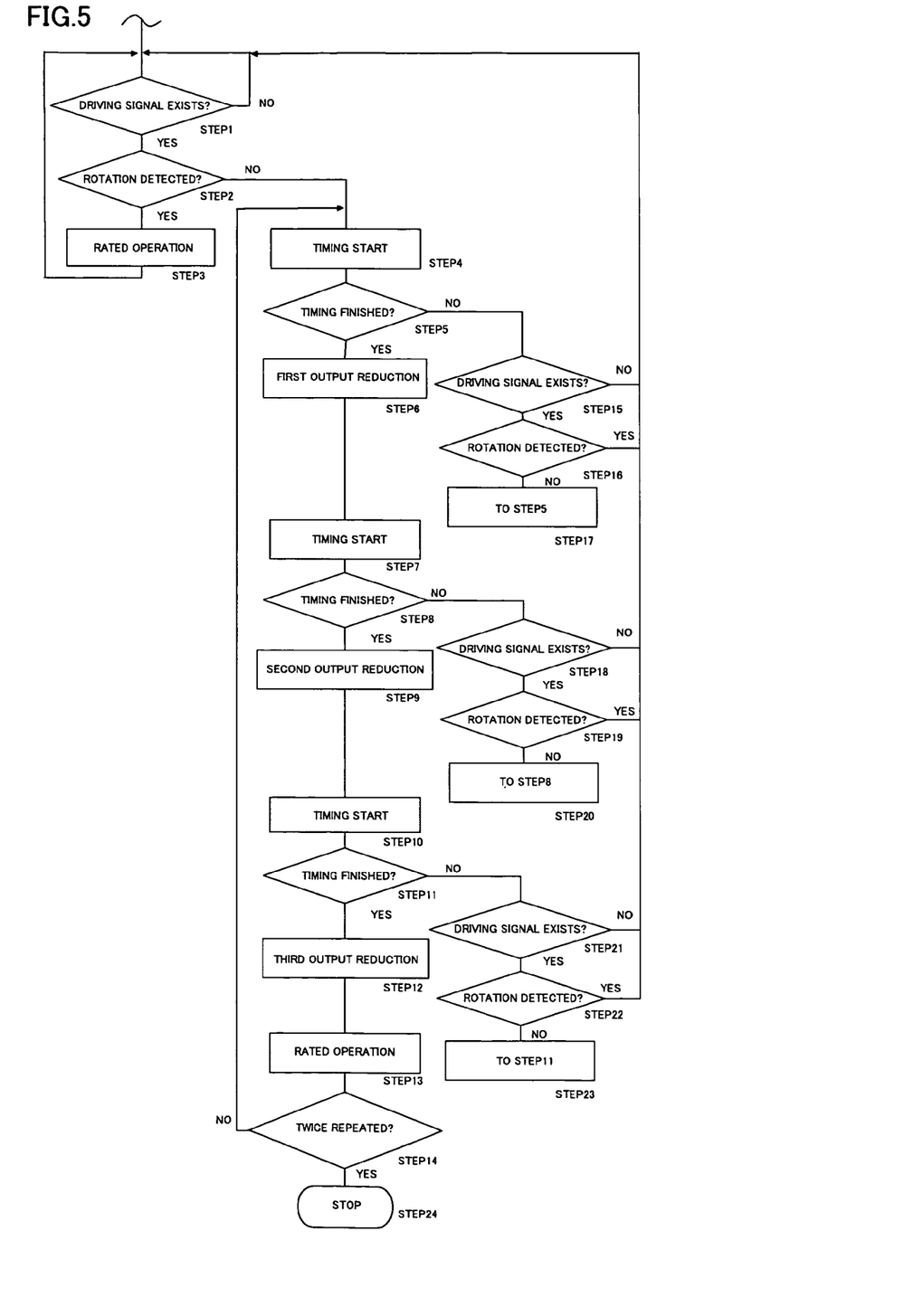
FIG. 5 is a flow chart showing a method for controlling the motorized roller shown in FIG. 1.

In the motorized roller 11 of the present embodiment, as shown in a flow chart (logic circuit) in FIG. 5, the motor driving circuit (the controller 10) monitors whether the driving motor 7 is normally rotating in steps 1, 2, and 3.

Specifically, the logic circuit proceeds to step 2 upon existence of a driving signal in step 1. In step 2, if and when a motor pulse is detected by the motor pulse recognition section 3 in the motor driving circuit 1, the lock detecting section 4 determines that the motor 7 is normally operating, but if and when a motor pulse has not been detected for a predetermined period of time (for 3 to 10 seconds, for example), the lock detecting section 4 determines that the motor 7 is locked. When the motor 7 is determined not to be locked, the driving circuit 1 makes a rated operation of the motor 7 and continues to monitor whether the motor 7 is normally rotating, returning to step 1.

When the driving motor 7 is determined to be locked, the logic circuit proceeds to steps 4, 5, and 6 and the lock detecting section 4 sends a signal to the power control section 5 so as to reduce electric power supplied to the motor 7.

Specifically, if and when the lock continues for a predetermined length of time, that is, until timing has finished in step 5 after having been started in step 4, the power control section 5 reduces electric power to the motor 7 in step 6 to a lower level, with the motor 7 continuing to operate while being supplied at the lower power level. A method of specific reduction of electric power supplied to the driving motor 7 will be described below.

Upon release of the lock during the length of time, naturally the logic circuit returns to step 1 from a step 16 and the rated operation is restarted in step 3.

After steps 4, 5, and 6 described above, if and when the lock of the motor 7 further continues, the lock detecting section 4 sends a signal to the power control section 5 so as to further reduce electric power supplied to the motor 7. Specifically, if and when the lock continues for a predetermined length of time, that is, until timing has finished in step 8 after having been started in step 7, the power control section 5 reduces electric power to the motor 7 in step 9. The method of specific reduction of electric power supplied to the driving motor 7 will be described below.

Upon release of the lock during the length of time, naturally the logic circuit returns to step 1 from step 19 and the rated operation is restarted in step 3.

Further, after steps 7, 8, and 9, if and when the lock of the motor 7 further continues, the logic circuit proceeds to steps 10, 11, and 12 and the lock detecting section 4 further reduces electric power supplied to the motor 7, in a manner similar to steps 7, 8, and 9.

Upon release of the lock during the length of time, naturally the logic circuit returns to step 1 from step 22 and the rated operation is restarted in step 3.

Still further, after steps 10, 11, and 12, if and when the lock of the motor 7 still further continues, the logic circuit proceeds to step 13 and the lock detecting section 4 once increases electric power supplied to the motor 7. This operation temporarily generates a high torque in the motorized roller 11. In the case that the roller 11 has become locked due to a foreign body stuck in the conveyor 20, for example, some foreign bodies may be removed due to an impact by temporary generation of a high torque in the roller 11. Step 13 is done in the expectation of this effect.

Then, the logic circuit proceeds to step 14, the number of repetition of processes from step 4 to step 13 is counted up. In the case that the repetition number is once, the circuit returns to step 4 to repeat the following processes. In the case that the repetition number is twice, it is no longer expected that the lock is released fortuitously, and thus the logic circuit proceeds to step 24 to stop supplying electric power to the motor 7 so as to prevent the motor 7 and other equipments from burnout.

Now, the method of reducing electric power supplied to the driving motor 7 will be specifically described below.

The power control section 5 receives a signal relating to a lock of the motor 7 from the lock detecting section 4, thereby sending a command signal to the motor driving section 2 so as to reduce electric power supplied to the motor 7 in the case of the lock of the motor 7. In the case of release of the lock (viz. in the case that a motor pulse signal is detected), the power control section 5 sends a command signal to the motor driving section 2 so as to increase electric power supplied to the motor 7. Upon reception of the command signals from the controller 6 and the power control section 5, the motor driving section 2 regulates electric power supplied to the motor 7 in response to these command signals. Herein, increasing or reduction of supplied electric power is, for example, performed by increasing or reduction of applied voltage.

The above-mentioned operation of the controller 10 will be specifically described below, making reference to a graph in FIG. 3, which shows an operating state of the motor 7 shown in FIG. 2.

Figure 3:
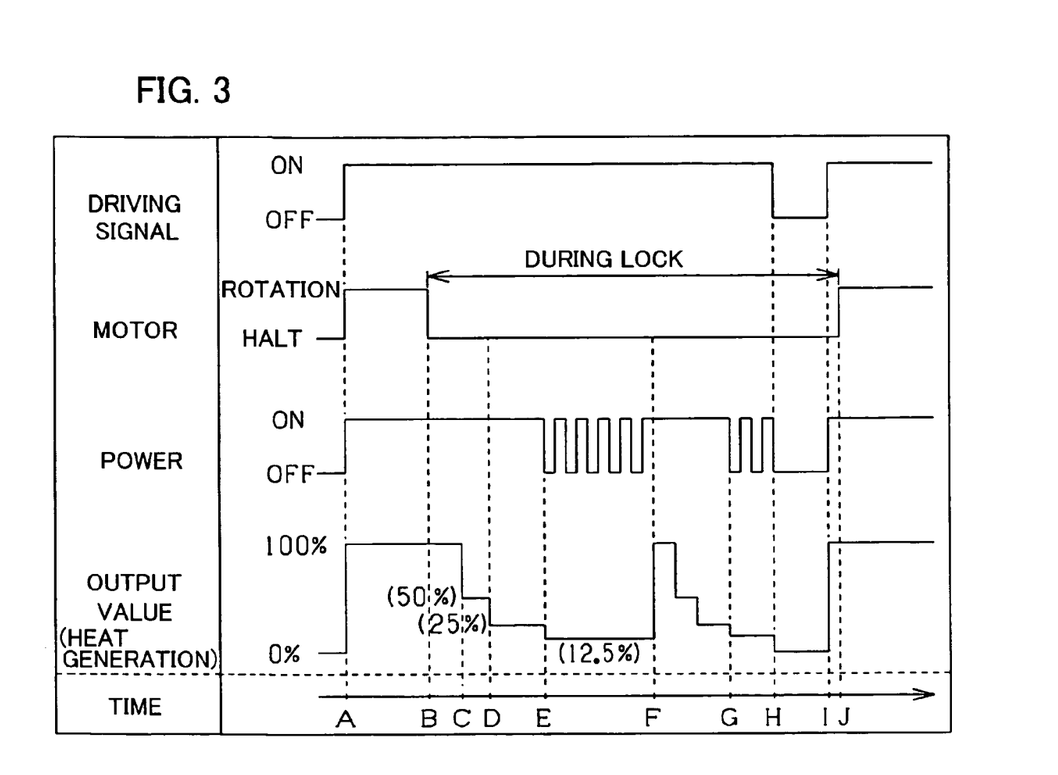
FIG. 3 is a graph showing an operating state of the driving motor shown in FIG. 2.

The graph in FIG. 3 draws a comparison among statuses of a driving signal, rotation, ON/OFF of power, and supplied power (heat generation) in the driving motor 7, with the same time axis. In the graph, the supplied power is replaced by an output value (heat generation). Further, a time lag exists actually until the output value of the motor 7 comes to a preset output value (100% output value, which is a rated value, for example), but variation of the output value (supplied power) is drawn as varied in a stepwise fashion, for convenience of description in the graph.

At time A, the power of the motor 7 is turned on to make the driving signal ON, so that the motor 7 is rotated and that the output value becomes 100% (viz. rated value). Until time B, the motor 7 is normally operated, and the motor pulse recognition section 3 recognizes motor pulses obtained from the Hall ICs 7a of the motor 7, thereby outputting motor pulse signals corresponding to the present output value of the motor 7 to the motor driving section 2.

The motor driving section 2 compares the preset output value with the actual detected output value, based on the motor pulse signals, thereby regulating the output value of the motor 7 such that the output value of the motor 7 maintains the preset value.

However, at time B, despite of ON of the driving signal and the power of the driving motor 7, the motor 7 becomes locked, causing stopping of rotation of the motor 7, and thus the Hall ICs 7a do not output a motor pulse.

In FIG. 2, the motor pulse recognition section 3 in the motor driving circuit 1 has not recognized motor pulses for a few seconds (for 3 to 10 seconds, for example) from time B, so that the lock detecting section 4 detects a lock of the motor 7 at time C.

Then, the lock detecting section 4 sends a command signal to the power control section 5 such that the output value of the motor 7 becomes 50% of the rated value, for example. The power control section 5 regulates the electric power supplied to the motor 7 depending on this command signal, so as to output a command signal to the motor driving section 2 such that the output value is reduced to become 50% of the rated value. A reduction rate of output at this stage is preferably about 30 to 70% of the rated value, and the present embodiment regulates so that the reduction rate becomes 50%, as described above.

Even at time D after a further few seconds (for 3 to 10 seconds, for example) from time C, the motor pulse recognition section 3 has not yet recognized a motor pulse and the lock detecting section 4 has still detected the lock of the motor 7, so that the lock detecting section 4 sets the electric power supplied to the motor 7 lower than before and the power control section 5 sets the output value to become 25% of the rated value in the same fashion as described above.

A reduction rate of output at this stage is preferably about 30 to 70% of the foregoing value and the present embodiment regulates so that the reduction rate becomes 50%, as described above.

If and when the motor pulse recognition section 3 has not yet recognized a motor pulse and the motor 7 has still been locked even at time E after a length of time (10 to 20 seconds, for example) from time D, the power control section 5 starts an intermittent supply of electric power to the driving motor at time E and continues the supply till time F, with the result that a time average of output value during this period is set to 12.5% of the rated value, for example. That is, as shown in FIG. 3, from time E to time F, the power of the motor 7 is frequently turned on and off (intermittent operation), so that the electric power supplied to the motor 7 is regulated such that the output value of the motor 7 becomes 12.5% of the rated value in time average.

Herein, a reduction rate of output at this stage is also preferably about 30 to 70% of the foregoing value and the present embodiment regulates such that the reduction rate becomes 50%, as described above.

Herein, a percentage (percent) of the output value set as above to the rated value is preset so as to be a value smaller than what may cause heat damage to a heat generating part such as a motor driving circuit or a motor coil of the driving motor 7. The foregoing description illustrates such an example that the output value is set to make the transition to 50%, 25%, and 12.5% from the rated value (100%). Thereby, an integrated value of the supplied electric power is made not to exceed the value at which the heat generating part of the driving motor 7 may be damaged by heat.

Then, at time F, the electric power is regulated such that the output value becomes the rated value (100%) and the lock detecting section 4 detects a lock status of the driving motor 7 according to whether a motor pulse is recognized or not. FIG. 3 shows an example where the lock has not yet released at time F.

In this case, until the lock is released, the operations done from time C to time F as described above are repeated as needed. The present embodiment repeats the above-mentioned operations twice as described above.

In the example shown in FIG. 3, the lock continues at times G and H and the power is off (that is, the supplied electric power and the output value are zero) from time H to time I.

Once the power has been turned on again at time I, the power control section 5 sends to the motor driving section 2 a command signal for setting the supplied electric power such that the output value of the motor 7 becomes the rated value (100%). In an example shown in FIG. 3, at time J when a very short period of time has passed after the power has been turned on again at time I, motor pulses are recognized and release of the lock is detected, so that the normal operation is performed (i.e., the operation is performed with the output value set to the rated value) after time J. In other words, a normal operation is performed on the condition that release of the lock is detected before a preset period of time has passed after the power has been turned on again. In contrast, if the lock is not released after the preset period of time has passed after the power has been turned on again, the electric power supplied to the motor 7 is reduced as well as at time C, and subsequently, the above-mentioned operations from time C to time F are repeated as needed.

Though the electric power supplied to the driving motor 7 is directly reflected in the heat generation under the lock, reduction of the supplied electric power as described above efficiently reduces the heat generation, thereby preventing heat damage of the driving motor 7 (the motor driving section 2 in the motor driving circuit 1) due to overload. Herein, though a motor coil (not shown) also generates heat under the lock, reduction of the supplied electric power as described above simultaneously avoids heat damage of the motor coil.

Embodying of the present invention as described above reduce heat generation of the driving motor 7 (the motor driving section 2 in the motor driving circuit 1) under the lock of the driving motor 7 (or the motorized roller 11), so as to dispense with a conventional large radiator plate, achieving miniaturization of the motor driving circuit 1. It is naturally possible to dispose a radiator plate as needed to regulate reduction of electric power supplied to the driving motor 7 so as to prevent heat damage of the motor driving circuit 1.

Without a radiator plate, for example, it is necessary to reduce the output value up to 50% of the rated value at time C as shown in FIG. 3, but with the radiator plate, it is possible to set supplied electric power such that the output value becomes 50 to 80% of the rated value at time C, for example. In other words, it is possible to set supplied electric power (heat generation) enough to protect the motor driving circuit 1 from heat damage depending on heat radiating capacity of a disposed radiator plate.

An example where a rotational state of the driving motor 7 is monitored is illustrated above, but instead, existence of rotation of a motorized roller (not shown) incorporating the driving motor 7 can be detected by a condition that an article supported on and to be conveyed by the motorized roller is not moved, for example, to detect whether the driving motor 7 is locked or not.

Further, the above-mentioned embodiment starts on an intermittent supply of electric power to the driving motor 7 on the condition that the number of stepwise reduction of the electric power supplied to the driving motor 7 has reached to a preset number. The above-mentioned embodiment is arranged to start an intermittent supply of electric power to the driving motor 7 after reducing twice the electric power supplied to the driving motor 7.

As a modified embodiment, it is possible to count the number of reduction of the electric power supplied the driving motor 7 to start an intermittent supply of electric power to the driving motor 7 on the condition that the counted number has reached a preset number.

Figure 6:
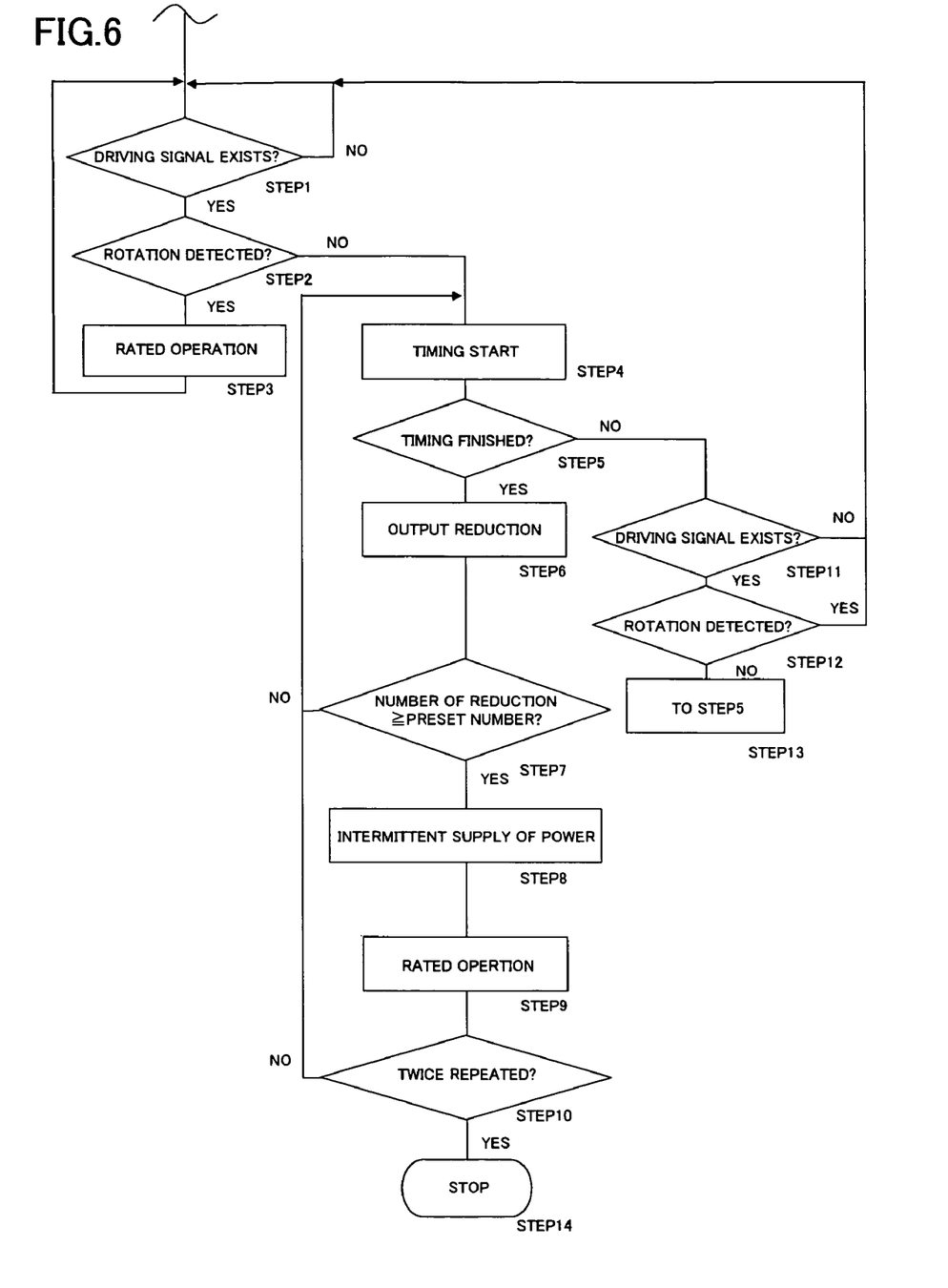
FIG. 6 is a flow chart showing a method for controlling a motorized roller of another embodiment of the present invention.

FIG. 6 is a flow chart of such method for controlling as described just above.

Figure 7:
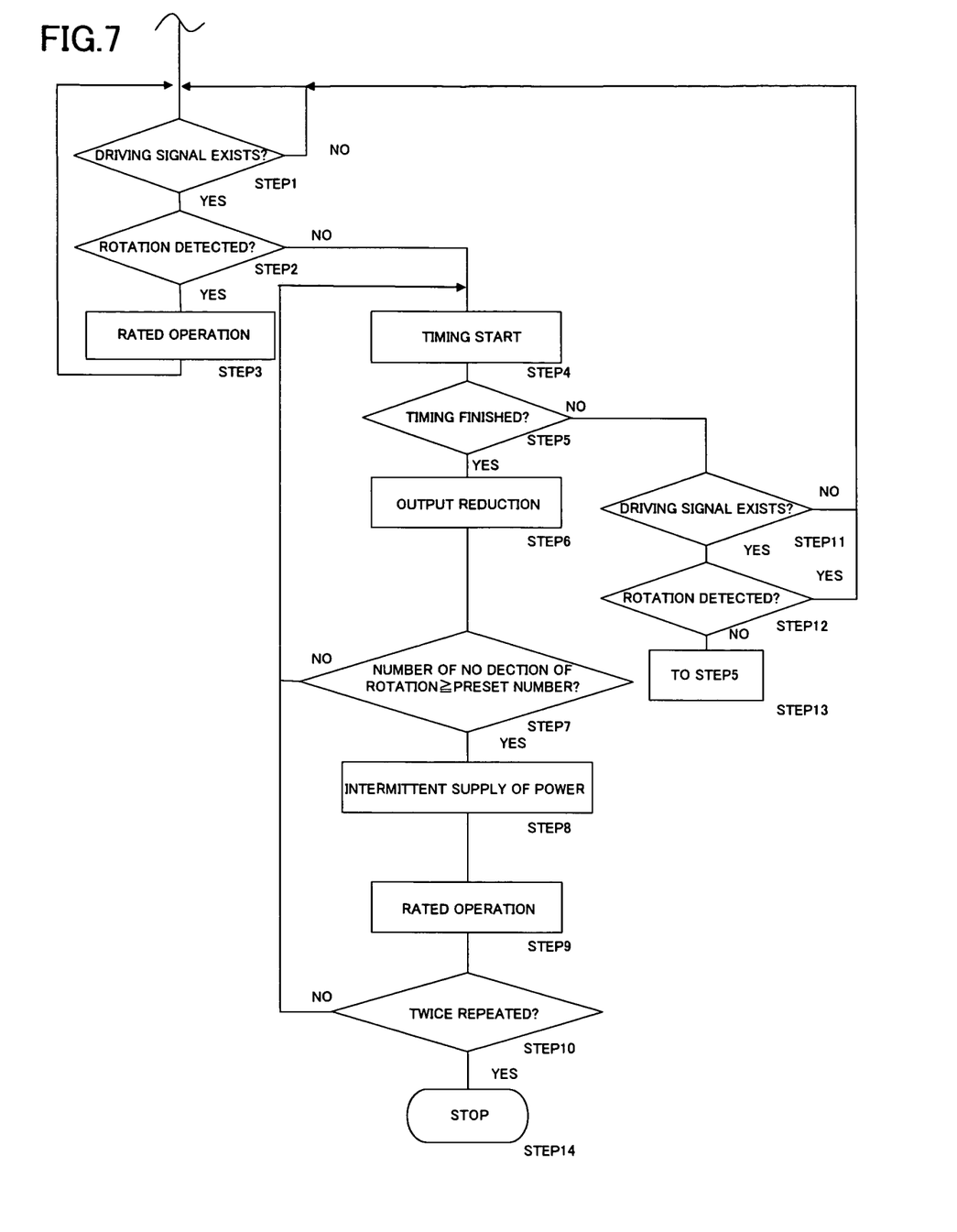
FIG. 7 is a flow chart showing a method for controlling a motorized roller of still another embodiment of the present invention.

Still further, it is possible to employ such a structure as including a step of detecting that the number of detection of a lock has reached a preset number.

FIG. 7 is a flow chart of such method for controlling as described just above. In the flow chart in FIG. 7, step 7 is one for detecting whether the number of no detection of rotation exceeds a preset number and this step detects the number of locks.

Figure 8:
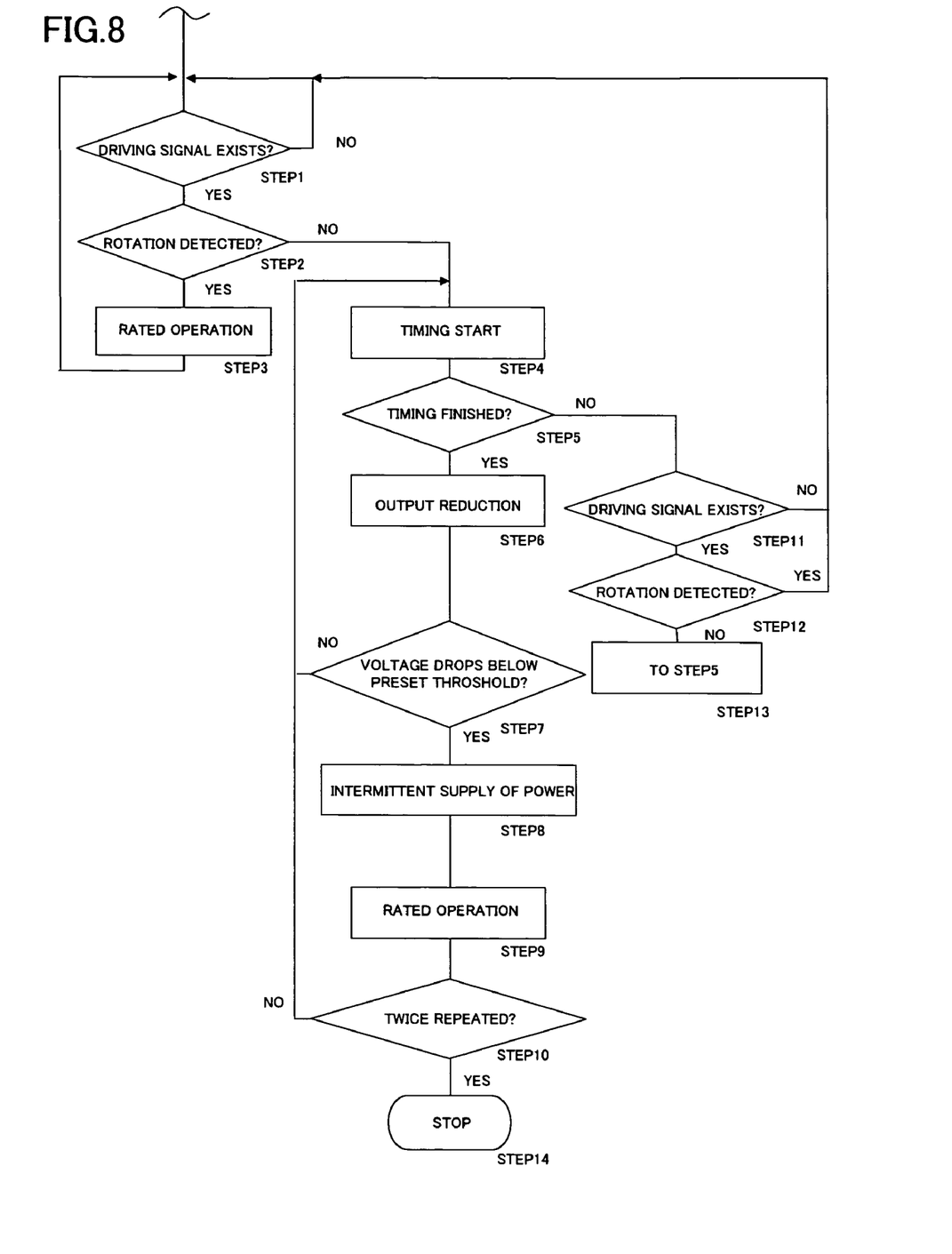
FIG. 8 is a flow chart showing a method for controlling a motorized roller of yet another embodiment of the present invention.

Yet further, instead of these, it is possible to employ such a structure as starting an intermittent supply of electric power to the driving motor 7 on the condition that a voltage applied to the driving motor 7 drops below a preset lower threshold. FIG. 8 is a flow chart of such method for controlling as described just above.

Figure 9:
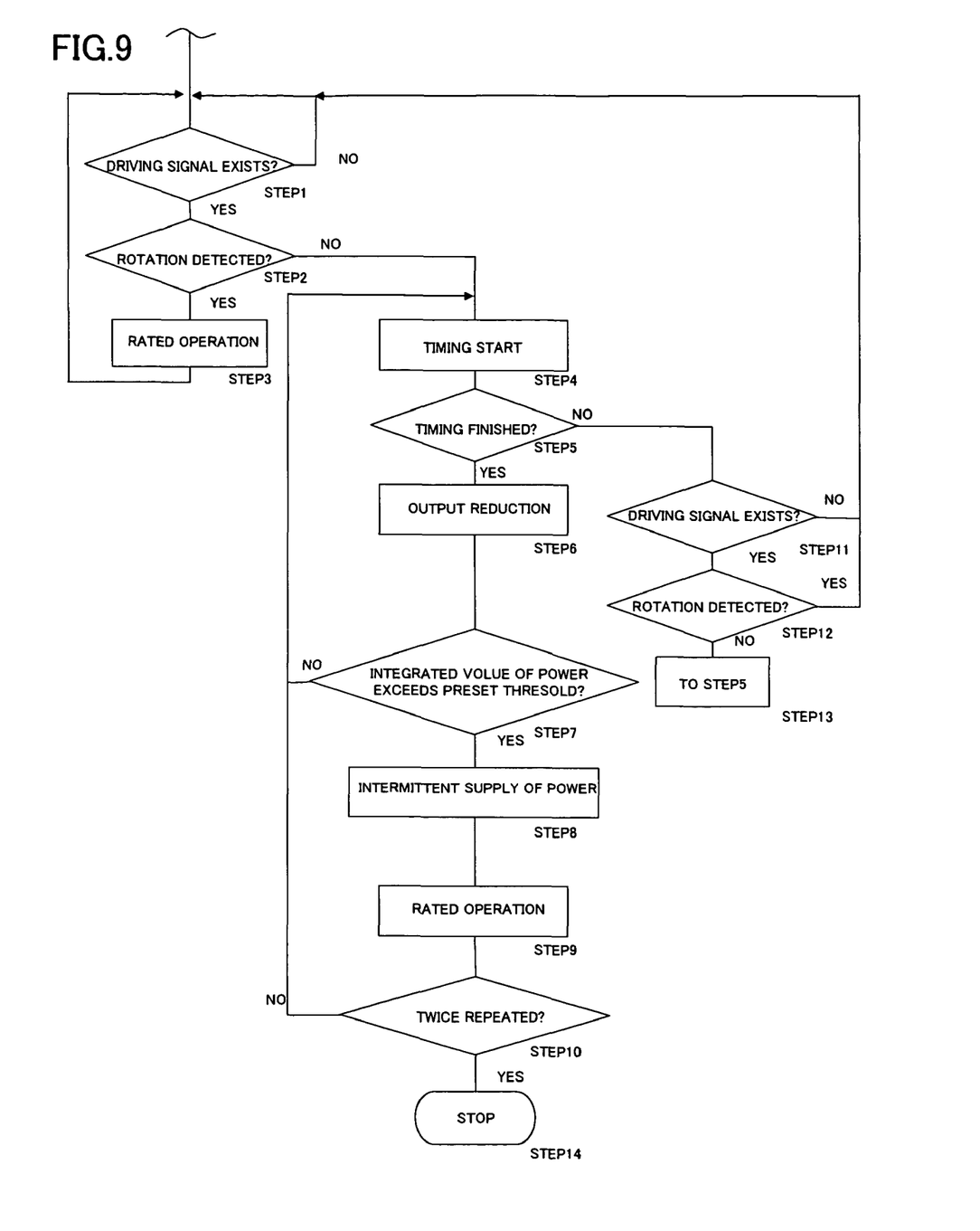
FIG. 9 is a flow chart showing a method for controlling a motorized roller of yet still another embodiment of the present invention.

Yet still further, it is possible to employ such a structure as starting an intermittent supply of electric power to the driving motor 7 on the condition that an integrated value of the electric power supplied to the driving motor after detection of a lock exceeds a preset upper threshold. FIG. 9 is a flow chart of such method for controlling as described just above.

The motorized roller 11 as described above can be used in a device such as a roller conveyor, a belt conveyor or a winding unit for winding elongated objects, for example, but not limited to, a winding device for a display as described in U.S. Pat. No. 6,979,976B2 or its counterpart, DE102004035469A1. Further, the conveyor 20 incorporating the motorized roller 11 may be a geared, chain, or belt conveyor.

The invention claimed is:

1. A motorized roller incorporating a driving motor for driving the roller and accompanied with a motor driving circuit for driving the motor, comprising:
 a lock detecting means adapted to detect a lock of at least one of the driving motor and the motorized roller; and
 a power control means adapted to control electric power supplied to the driving motor, wherein the control means reduces the electric power supplied to the driving motor to a lower level upon detection of the lock of the at least one of the driving motor and motorized roller by the lock detecting means so that the driving motor continues to operate while being supplied at the lower power level, the motorized roller being adapted to intermittently supply electric power to the driving motor upon detection of the lock and under a predetermined condition.

2. The motorized roller as defined in claim 1, wherein the control means is adapted to reduce the electric power supplied to the driving motor in a stepwise fashion.

3. A motorized roller incorporating a driving motor for driving the roller and accompanied with a motor driving circuit for driving the motor, comprising:

a lock detecting means adapted to detect a lock of at least one of the driving motor and the motorized roller; and a power control means adapted to control electric power supplied to the driving motor, wherein the control means reduces the electric power supplied to the driving motor to a lower level upon detection of the lock of the at least one of the driving motor and motorized roller by the lock detecting means so that the driving motor continues to operate while being supplied at the lower power level, wherein reduction of the electric power is performed by reduction of voltage applied to the motor, the motorized roller being adapted to start an intermittent supply of electric power to the driving motor on the condition that the voltage drops below a preset lower threshold.

4. A motorized roller incorporating a driving motor for driving the roller and accompanied with a motor driving circuit for driving the motor, comprising:

a lock detecting means adapted to detect a lock of at least one of the driving motor and the motorized roller; and a power control means adapted to control electric power supplied to the driving motor, wherein the control means reduces the electric power supplied to the driving motor to a lower level upon detection of the lock of the at least one of the driving motor and motorized roller by the lock detecting means so that the driving motor continues to operate while being supplied at the lower power level, wherein the control means is adapted to reduce the electric power supplied to the driving motor in a stepwise fashion, the motorized roller being adapted to start an intermittent supply of electric power to the driving motor on the condition that the number of stepwise reduction of the electric power has reached a preset number.

5. A motorized roller incorporating a driving motor for driving the roller and accompanied with a motor driving circuit for driving the motor, comprising:

a lock detecting means adapted to detect a lock of at least one of the driving motor and the motorized roller; and a power control means adapted to control electric power supplied to the driving motor, wherein the control means is adapted to reduce the electric power supplied to the driving motor upon detection of the lock of the at least one of the driving motor and the motorized roller by the lock detecting means, the motorized roller adapted to start an intermittent supply of electric power to the driving motor on the condition that an integrated value of the electric power supplied to the driving motor after detection of the lock exceeds a preset upper threshold.

6. A controller for controlling a motorized roller incorporating a driving motor for driving the roller, comprising:

a lock detecting means adapted to detect a lock of at least one of the driving motor and the motorized roller; and a power control means adapted to control electric power supplied to the driving motor, the controller reducing the electric power supplied to the driving motor to a lower level upon detection of the lock of the at least one of the driving motor and motorized roller by the lock detecting means so that the driving motor continues to operate while being supplied at the lower power level, the motorized roller being adapted to intermittently supply electric power to the driving motor upon detection of the lock and under a predetermined condition.

7. The controller as defined in claim 6, being adapted to reduce the electric power supplied to the driving motor in a stepwise fashion.

8. A method for controlling a driving motor for driving a motorized roller and incorporated in the roller, the method comprising:

detecting a lock of at least one of the motorized roller and the driving motor, so as to reduce electric power supplied to the driving motor to a lower level upon detection of the lock so that the driving motor continues to operate while being supplied at the lower power level; and determining whether the number of detection of the lock has reached a predetermined number, so as to start an intermittent supply of electric power to the driving motor on the condition that the number of detection of the lock has reached the predetermined number.

9. A method for controlling a driving motor for driving a motorized roller and incorporated in the roller, the method comprising:

detecting a lock of at least one of the motorized roller and the driving motor so as to reduce electric power supplied to the driving motor upon detection of the lock; and calculating an integrated value of the electric power supplied to the driving motor after detection of the lock, so as to start an intermittent supply of electric power to the driving motor on the condition that the integrated value exceeds a preset upper threshold.

10. The method as defined in claim 9, further comprising the step of calculating the integrated value.

11. A conveyor comprising:

a driving motor for driving the conveyor, a motor driving circuit for driving the driving motor;

a lock detecting means that detects a lock of the driving motor; and a power control means that controls electric power supplied to the driving motor, wherein the control means reduces electric power supplied to the driving motor to a lower level upon detection of the lock of the driving motor by the lock detecting means so that the driving motor continues to operate while being supplied at the lower power level, wherein reduction of the electric power is performed by reduction of voltage applied to the motor, the conveyor being adapted to start an intermittent supply of electric power to the driving motor on the condition that the voltage drops below a preset lower threshold.

12. The conveyor as defined in claim 11,
wherein the control means is adapted to reduce the electric power supplied to the driving motor in a stepwise fashion.

13. A conveyor comprising:
a driving motor for driving the conveyor;
a motor driving circuit for driving the driving motor;
a lock detecting means that detects a lock of the driving motor; and
a power control means that controls electric power supplied to the driving motor,
wherein the control means reduces electric power supplied to the driving motor to a lower level upon detection of the lock of the driving motor by the lock detecting means so that the driving motor continues to operate while being supplied at the lower power level,
wherein the control means is adapted to reduce the electric power supplied to the driving motor in a stepwise fashion,
the conveyor being adapted to start an intermittent supply of electric power to the driving motor on the condition that the number of stepwise reduction of the electric power has reached a preset number.

14. A conveyor comprising:
a driving motor for driving the conveyor;
a motor driving circuit for driving the driving motor;
a lock detecting means adapted to detect a lock of the driving motor; and
a power control means adapted to control electric power supplied to the driving motor,
wherein the control means is adapted to reduce electric power supplied to the driving motor upon detection of the lock of the driving motor by the lock detecting means,
the conveyor adapted to start an intermittent supply of electric power to the driving motor on the condition that an integrated value of the electric power supplied to the driving motor after detection of the lock exceeds a preset upper threshold.

15. A method for controlling a conveyor driven by a driving motor and having a motor driving circuit comprising the steps of:
detecting a lock of the driving motor;
reducing electric power supplied to the driving motor to a lower level upon detection of the lock so that the driving motor continues to operate while being supplied at the lower power level; and
determining whether the number of detection of the lock has reached the predetermined number, so as to start an intermittent supply of electric power to the driving motor on the condition that the number of detection of the lock has reached the predetermined number.

16. A method for controlling a conveyor driven by a driving motor and having a motor driving circuit comprising the steps of:
detecting a lock of the driving motor;
reducing electric power supplied to the driving motor upon detection of the lock; and
calculating an integrated value of the electric power supplied to the driving motor after detection of the lock, so as to start an intermittent supply of electric power to the driving motor on the condition that the integrated value exceeds a preset upper threshold.

* * * * *